United States Patent
Harada et al.

(10) Patent No.: US 6,797,666 B2
(45) Date of Patent: Sep. 28, 2004

(54) HONEYCOMB FILTER AND PROCESS FOR PRODUCTION THEREOF

(75) Inventors: Takashi Harada, Nagoya (JP); Toshiyuki Hamanaka, Suzuka (JP)

(73) Assignee: NGK Insulators, Ltd., Nagoya (JP)

( * ) Notice: Subject to any disclaimer, the term of this patent is extended or adjusted under 35 U.S.C. 154(b) by 18 days.

(21) Appl. No.: 10/258,808

(22) PCT Filed: Feb. 27, 2002

(86) PCT No.: PCT/JP02/01800
§ 371 (c)(1),
(2), (4) Date: Oct. 28, 2002

(87) PCT Pub. No.: WO02/070106
PCT Pub. Date: Sep. 12, 2002

(65) Prior Publication Data
US 2003/0138596 A1 Jul. 24, 2003

(30) Foreign Application Priority Data
Mar. 1, 2001 (JP) ........................ 2001-057325

(51) Int. Cl.[7] .................... B01J 21/18; B01J 27/224; B32B 3/12; B32B 3/20
(52) U.S. Cl. ............... 502/180; 502/178; 502/527.14; 502/527.19; 502/527.21; 502/527.22; 502/439; 428/116; 428/117; 428/188
(58) Field of Search ................. 502/178, 180, 502/527.14, 527.19, 527.21, 524.22, 439; 428/116, 117, 188

(56) References Cited
U.S. PATENT DOCUMENTS

| | | | |
|---|---|---|---|
| 4,293,357 A | * 10/1981 | Higuchi et al. | 156/89.22 |
| 4,340,403 A | * 7/1982 | Higuchi et al. | 55/523 |
| 4,455,180 A | * 6/1984 | Hillman et al. | 264/631 |
| 4,953,627 A | 9/1990 | Ito et al. | 165/8 |
| 5,914,187 A | 6/1999 | Naruse et al. | 428/327 |

FOREIGN PATENT DOCUMENTS

| | | | |
|---|---|---|---|
| JP | 55-046338 | 4/1980 | |
| JP | A 3-121213 | 5/1991 | |
| JP | U 6-47620 | 6/1994 | |
| JP | 07-054643 | * 2/1995 | ............ F01N/3/20 |
| JP | 08-028246 | 1/1996 | |
| JP | A 2000-102709 | 4/2000 | |
| JP | A 2000-279728 | 10/2000 | |
| JP | A 2000-279729 | 10/2000 | |
| JP | A 2001-190916 | 7/2001 | |
| JP | A 2002-60279 | 2/2002 | |

* cited by examiner

Primary Examiner—Mark L. Bell
Assistant Examiner—Patricia L. Hailey
(74) Attorney, Agent, or Firm—Oliff & Berridge, PLC (57) ABSTRACT

A honeycomb filter is composed mainly of silicon carbide or of metallic silicon and silicon carbide; the filter being formed by bonding a plurality of honeycomb segments each of which has a plurality of through-holes being partitioned by porous partition walls. The filter is plugged alternately at the exhaust gas inlet face and exhaust gas outlet face of honeycomb segments. Each two adjacent honeycomb segments are contacted with each other at each a portion of their sides facing each other. They are bonded with each other at least at part of each portion of said sides other than the contacted portion through a bonding material having a strength lower than that of a basal body of honeycomb segment. Thus, the thermal stresses generated among the respective portions constituting the filter is reduced. The generation of cracks, etc. can be also prevented considerably.

17 Claims, 11 Drawing Sheets

HONEYCOMB FILTER AND PROCESS FOR PRODUCTION THEREOF

TECHNICAL FIELD

The present invention relates to a honeycomb filter used in a burner (e.g. a boiler) or an exhaust gas purifier of an internal combustion engine (e.g. a diesel engine), as well as to a process for producing such a honeycomb filter.

BACKGROUND ART

Recently, the influence of a particulate matter emitted from a diesel engine, etc., on environment has been taken up seriously. As an important means for capturing and removing such a particulate matter, a honeycomb filter for exhaust gas purification is in use.

The honeycomb filter for exhaust gas purification generally has a structure possessing a plurality of through-holes which are separated from each other by porous partition walls and which are plugged alternately at its exhaust gas inlet face and its exhaust gas outlet face. The honeycomb filter captures and removes a particulate matter contained in an exhaust gas, by forcibly allowing an exhaust gas which enters thereinto from the open through-holes of the exhaust gas inlet face, to pass through the partition walls in the filter.

By the way, such a honeycomb filter is, for its feature, exposed to the rapid temperature change of exhaust gas or locally heated to a high temperature, during the use; the temperature distribution of the filter becomes nonuniform; as a result, the thermal stress of the filter increases due to the difference in the thermal expansion among the respective portions constituting the filter, and consequently the filter generates cracks, etc. This problem is being pointed out.

When the honeycomb filter is used particularly as a means for exhaust gas purification in diesel engine, etc., the filter is locally heated to a high temperature in the filter regeneration step in which the fine carbon particles deposited on the filter is burnt for removal; therefore, generation of cracks, etc. in the filter is being taken up as a serious problem.

Further, since such a filter is exposed to very high temperatures, there is being used a filter composed mainly of highly heat-resistant silicon carbide, or of metallic silicon and silicon carbide. However, silicon carbide, etc. have a drawback of high thermal expansion coefficient; therefore, the filter generates a large thermal stress and has had a problem of generating cracks, etc. more easily.

For these problems, there have heretofore been proposed various honeycomb structures each obtained by bonding a plurality of honeycomb segments via a bonding material in order to reduce the thermal stresses of various positions of honeycomb structure (these positions are restrained by each other and are unable to deform freely under the thermal stresses).

In, for example, JP-B-61-51240 is disclosed a thermal shock-resistant rotary heat regenerator obtained by bonding a plurality of ceramic honeycomb segments with a bonding material having substantially the same mineral composition as the honeycomb segment and showing a thermal expansion coefficient different from that of the honeycomb segment by 0.1% or less at 800° C.

In this rotary heat regenerator, however, since the mineral composition of the bonding material is substantially the same as that of the honeycomb segment, the individual honeycomb segments are greatly restrained by the bonding material and there has been a problem in that the thermal stress generated by each honeycomb segment cannot be reduced sufficiently.

Also, in JP-A-8-28246 is disclosed a ceramic honeycomb filter improved in the durability of the basal body of honeycomb filter, obtained by bonding a plurality of honeycomb segments with an elastic sealing material formed by bonding at least a three-dimensionally interwoven inorganic fiber and inorganic particles with each other via an inorganic binder and an organic binder.

In this honeycomb filter, however, since the thermal conductivity of the sealing material is low and the individual honeycomb segments are thermally shielded from each other, the temperature distribution among the respective portions constituting the filter cannot be uniformed and the reduction in the thermal stress generated in the honeycomb filter has not been fully sufficient.

The present invention has been made in view of the above-mentioned problems, and aims at providing a honeycomb filter which can reduce the thermal stresses among the respective portions constituting the filter and can highly suppress generation of cracks, etc. and which functions well particularly when composed mainly of silicon carbide or of metallic silicon and silicon carbide, and a process for producing such a honeycomb filter.

DISCLOSURE OF THE INVENTION

The present inventor made a study in order to achieve the above aim. As a result, the present inventor found out that the above aim can be achieved by securing a high thermal conductivity in the whole portion of a honeycomb filter to be produced with contacting each two adjacent honeycomb segments each other at each portion of the sides facing each other, and further by employing such a structure that honeycomb segments are bonded at least at part of each portion other than the above portion (this portion is hereinafter referred to as "contact portion" in some cases), directly or via a heat-conductive member, via a bonding material having a strength lower than that of a basal body material of honeycomb segment. The present invention has been completed based on the above finding.

According to the present invention, there is provided a honeycomb filter obtained by bonding a plurality of honeycomb segments each having a plurality of through-holes which are separated from each other by porous partition walls and which are plugged alternately at the exhaust gas inlet face and exhaust gas outlet face of honeycomb segment, characterized in that each two adjacent honeycomb segments are allowed to contact with each other at each portion of their sides facing each other and are bonded with each other at least at part of each portion of said sides other than the contacted portion via a bonding material having a strength lower than that of a basal body of honeycomb segment.

In the present invention, it is preferred that the each portion of two sides of each two adjacent honeycomb segments facing each other, other than the portion at which they are contacted with each other directly or via a heat-conductive member (the former portion is hereinafter referred to as "noncontact portions" in some cases) is provided so as to include at least each whole part of the sides having the contact portion, opening to the exhaust gas inlet face of honeycomb segment. More preferably, the portion is provided so as to include at least each whole part of the sides having the contact portion, opening to the exhaust gas inlet face of honeycomb segment, the exhaust gas outlet face of honeycomb segment and an outer surface of honeycomb filter. In this case, it is also preferred that the noncontact portion includes at least each part of said sides having the contact portion, leading to the exhaust gas inlet face and the bonding material is provided at part of the non-contacted portion.

In the present invention, it is also preferred to have such a structure that at least one of the each two adjacent honeycomb segments has a projection at a portion of its side facing one side of the other honeycomb segment and contacts, via this projection, with a portion of one side of the other adjacent honeycomb segment, or that at least one of the each two adjacent honeycomb segments has a heat-conductive member composed of the same material as that of the honeycomb segments at a portion of its side facing one side of the other honeycomb segment and contacts, via this heat-conductive member, with a portion of the side of the other adjacent honeycomb segment.

In the present invention, it is also preferred that each honeycomb segment is composed mainly of silicon carbide or of metallic silicon and silicon carbide, that the bonding material is composed mainly of a heat-resistant inorganic compound, and that the partition walls formed between the through-holes of honeycomb segment have a metal having a catalytic activity, loaded thereon.

Meanwhile, according to the present invention, there is provided a process for producing a honeycomb filter, characterized by kneading a powder material composed of a ceramic and/or a metal, a binder and water to obtain a puddle and molding the puddle to obtain a honeycomb structure having a plurality of through-holes separated by partition walls from each other, drying the honeycomb structure and then plugging the plurality of through-holes alternately at the exhaust gas inlet face and exhaust gas outlet face of honeycomb structure to obtain a dried honeycomb segment, bonding, to a portion of each side of the dried honeycomb segment, a heat-conductive member composed of the same material as that of the dried honeycomb segment, followed by drying and firing to obtain a composite honeycomb segment, contacting the heat-conductive member-provided honeycomb segment, via the heat-conductive member, with a portion of a side of other adjacent honeycomb segment facing the former honeycomb segment, and providing, at least at part of a noncontact portion, a bonding material having a strength lower than the strength of a basal body of honeycomb segment, to obtain a unified body.

According to the present invention, there is also provided a process for producing a honeycomb filter, characterized by kneading a powder material composed of a ceramic and/or a metal, a binder and water to obtain a puddle and molding the puddle to obtain a honeycomb structure having a plurality of through-holes separated by partition walls from each other, drying the honeycomb structure and then plugging the plurality of through-holes alternately at the exhaust gas inlet face and exhaust gas outlet face of honeycomb structure to obtain a dried honeycomb segment, subjecting the dried honeycomb segment to a cutting operation to form a projection at each side of the dried honeycomb segment, and conducting firing to obtain a honeycomb segment, contacting each projection formed at each side of the honeycomb segment, with a portion of a side of other adjacent honeycomb segment facing the former honeycomb segment, and providing, at least at part of a noncontact portion, a bonding material having a strength lower than the strength of the dried honeycomb segment, to obtain a unified body.

In these processes of the present invention, the powder material is preferably composed mainly of silicon carbide or of metallic silicon and silicon carbide. Also, the bonding material is preferably composed mainly of a heat-resistant inorganic compound.

Thus, in the present invention, since each two honeycomb segments are bonded with each other at least at each portion with a bonding material having a strength lower than that of the basal body of honeycomb segment, the restraint of each honeycomb segment by the bonding material is low and the individual portions of filter can be freely deformed corresponding to their changes in temperature. Consequently, the thermal stress generating in filter is low even when nonuniform temperature distribution appears in various portions of the filter during the use of the filter; as a result, generation of cracks can be prevented and a honeycomb filter superior in durability can be obtained.

Further, in the present invention, since a plurality of segments are in contact with each other at each portion of their sides facing each other, the contact ensures the thermal conductivity of whole filter together with a bonding material or with no help of such a bonding material and the temperature distribution in filter can be uniformized. As a result, the thermal stresses in various positions of filter during the use of filter can be further reduced, in addition to the above-mentioned effect obtained by the bonding material, and generation of cracks can be prevented considerably. Such an effect is particularly striking when the honeycomb segments are composed mainly of highly heat-conductive silicon carbide, or of metallic silicon and silicon carbide.

BRIEF DESCRIPTION OF THE DRAWINGS

FIGS. 12(a) and (b) schematically show still other embodiment of the honeycomb filter according to the present invention.

FIGS. 13(a) and (b) schematically show still other embodiment of the honeycomb filter according to the present invention.

BEST MODE FOR CARRYING OUT THE INVENTION

Modes for carrying out the present invention are specifically described below with reference to the accompanying drawings.

1. Honeycomb Filter

Figure 1:
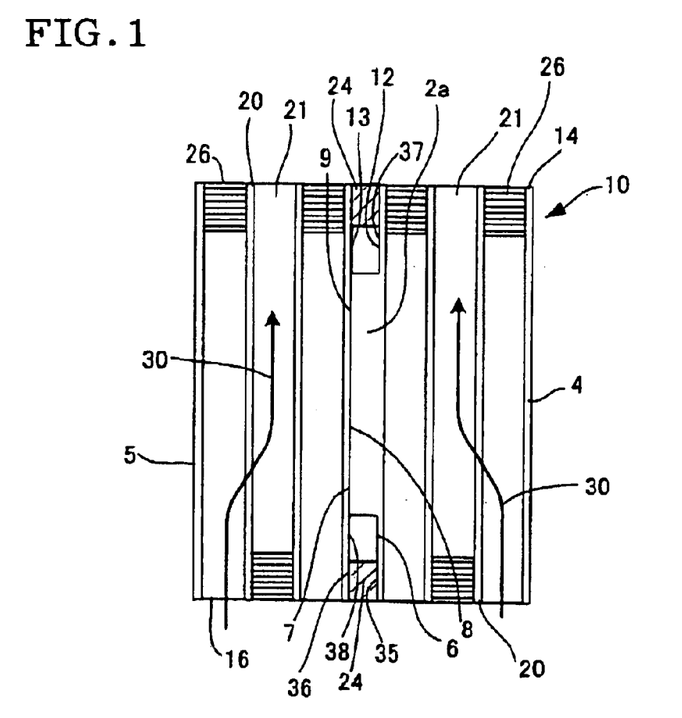
FIG. 1 is a sectional view schematically showing an embodiment of the honeycomb filter according to the present invention.

As shown in FIG. 1, the honeycomb filter 10 of the present invention is such a honeycomb filter as each two adjacent honeycomb segments 4 and 5 are allowed to contact with each other at each portion of their sides 6 and 7 facing each other and are bonded with each other at least at part of each noncontact portion 12 via a bonding material 24 having a strength lower than that of the basal bodies 4 and 5 of the honeycomb segments.

Thereby, as mentioned previously, the thermal stresses in various positions of filter during its use can be reduced considerably and generation of cracks, etc. can be prevented greatly.

As shown in FIG. 1, the honeycomb segments 4 and 5 in the present invention have a structure having a plurality of through-holes 21 which are separated from each other by porous partition walls 20 and which are plugged alternately at the exhaust gas inlet face 16 and exhaust gas outlet face 14 of honeycomb segment with a plugging material 26. By allowing an exhaust gas 30 to flow into the filter from the through-holes opening to the exhaust gas inlet face 16 and forcibly passing the exhaust gas through the partition walls 20 in the filter, the particulate matter contained in the exhaust gas is collected and removed.

As the material for the honeycomb segments 4 and 5, there can be mentioned, for example, ceramics each containing, as its main crystalline phase, at least one kind selected from the group consisting of non-oriented cordierite, oriented cordierite, mullite-zircon, mullite, zircon, cordierite-mullite, mullite-aluminum titanate, clay-bonded silicon carbide, metallic silicon, zirconia-spinel, etc.

Of these, preferred are those each containing, as its main crystals, silicon carbide or metallic silicon and silicon carbide, because they are superior in heat resistance and thermal conductivity and secure high thermal conductivity in the whole portion of filter, making it possible to reduce the thermal stresses of various positions of filter.

In the present invention, there is no particular restriction as to the shape and cell density of the through-holes 21 of the honeycomb segments 4 and 5. Desired shape and cell density can be employed appropriately depending upon the application, etc. of filter.

Figure 12A:
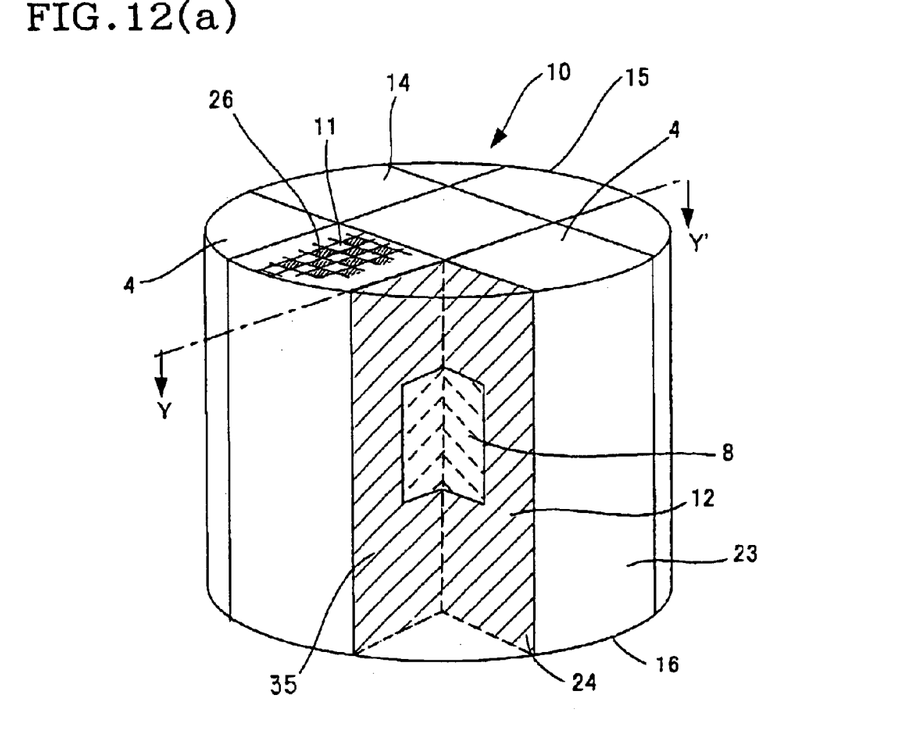
FIG. 12(a) is a perspective view.
Figure 12B:
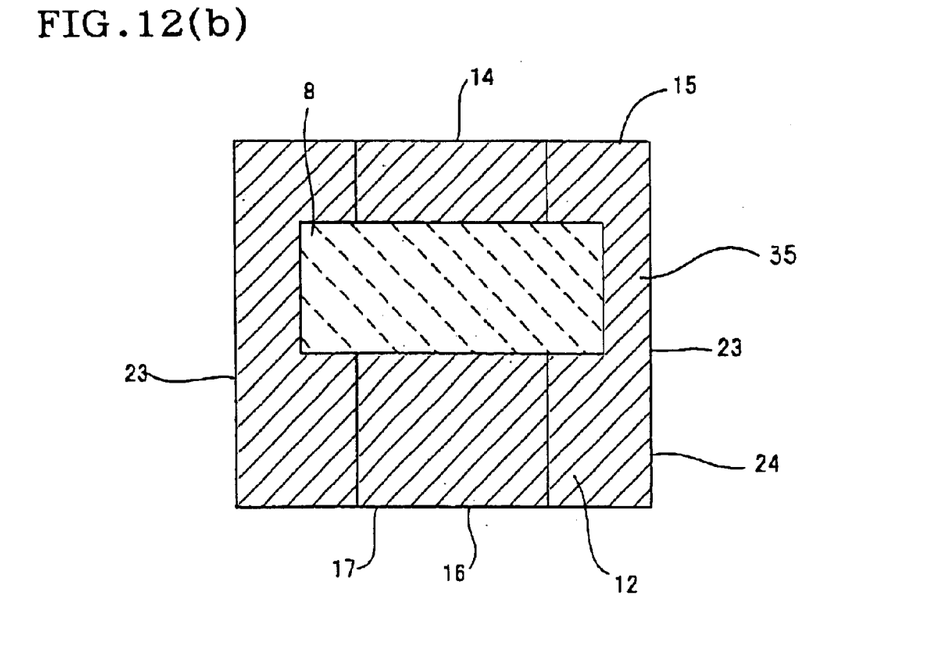
FIG. 12(b) is a sectional view taken at Y–Y' of FIG. 12(a).

In the present invention, there is no particular restriction, either, as to the shape of the honeycomb segments 4 and 5. However, there can be mentioned, for example, a honeycomb segment obtained by cutting, for example, a column into three or four portions with a plane passing the central axis 31 of the column (the section of the honeycomb segment, perpendicular to the axial direction has a fan shape), as shown in FIGS. 4 to 11; and a honeycomb segment obtained by cutting, for example, a column into nine or more portions in the axial direction at given intervals (the sections of individual honeycomb segments 4, perpendicular to the axial direction have various shapes such as fan shape, square shape and the like), as shown in FIGS. 12(a) and (b) and FIGS. 13(a) and (b). Of these, preferred is such a honeycomb segment 4 as a honeycomb filter 10 is divided into nine or more portions, as shown in FIGS. 12(a) and (b) and FIGS. 13(a) and (b), because, in such a honeycomb segment, a contact portion 8 can be provided in a large number and three-dimensionally and the thermal stress in honeycomb filter can be reduced considerably.

When the honeycomb filter 10 is used as a means for purification of exhaust gas emitted from internal combustion engine or burner, it is preferred to load a metal having a catalytic activity, such as Pt, Pd, Rh or the like, on the partition walls 20 in order to accelerate the combustion and removal of captured particulate matter and conduct filter regeneration effectively.

The honeycomb filter 10 of the present invention has a structure in which the above-mentioned each two adjacent honeycomb segments 4 and 5 are contacted with each other at each portion of their sides 6 and 7 facing each other; thereby, thermal conductivity is secured in the entire portion of the filter 10 with no help of any bonding material 24 or with the help of such a bonding material 24, and the thermal stresses in various positions of filter can be reduced.

In the present specification, "contact" refers to a state in which thermal conduction exists between the honeycomb segments 4 and 5 and, when deformation has appeared owing to thermal expansion, the positional relationship of the sides of honeycomb segments 4 and 5, facing each other can change.

Figure 2:
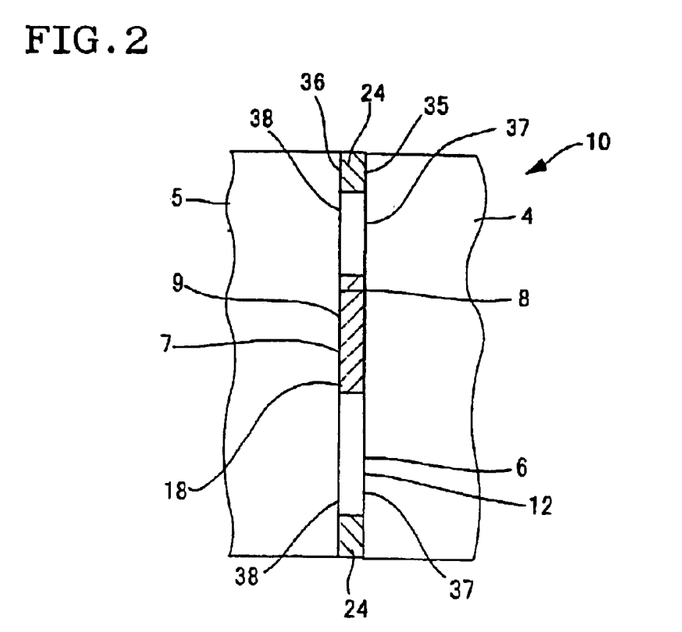
FIG. 2 is a partial side view schematically showing other embodiment of the honeycomb filter according to the present invention.
Figure 3:
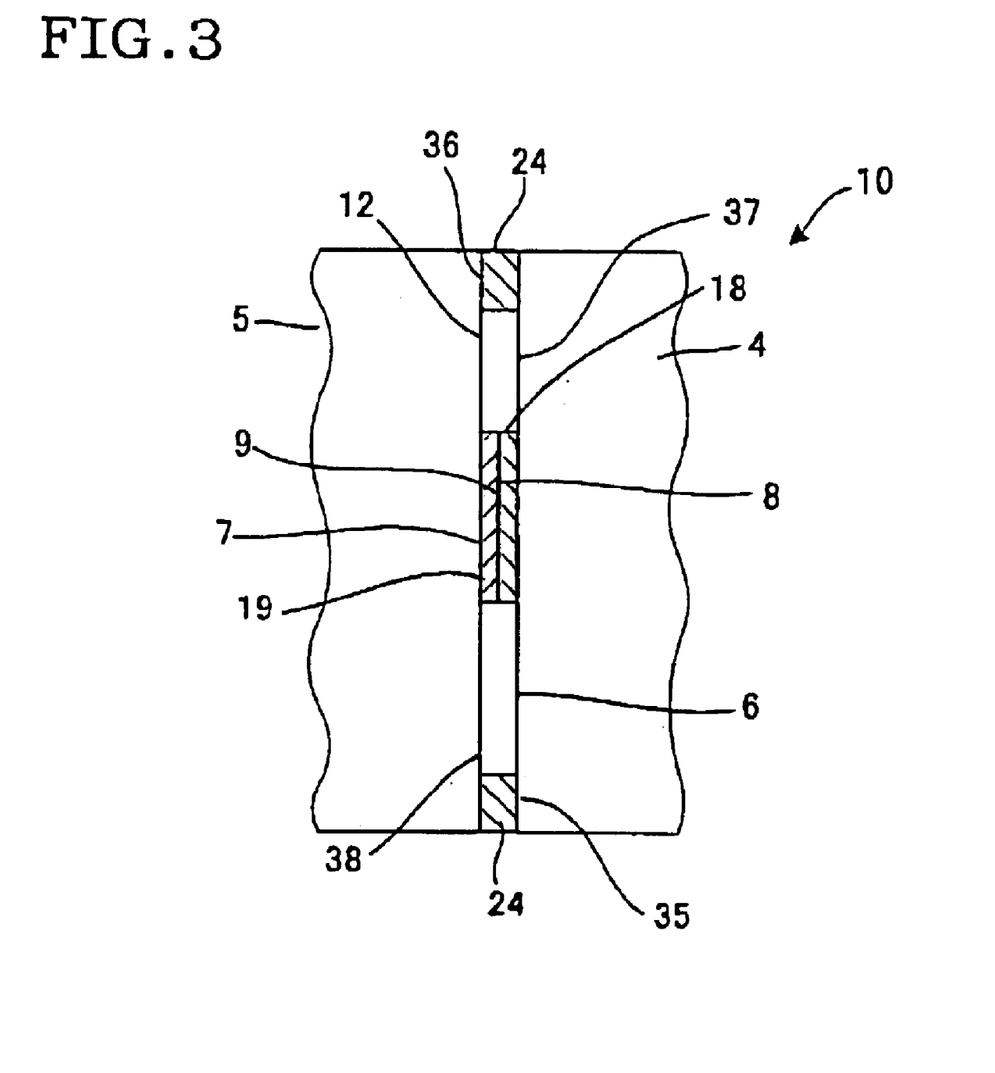
FIG. 3 is a partial side view schematically showing still other embodiment of the honeycomb filter according to the present invention.

As the honeycomb filter, there can specifically be mentioned, for example, a honeycomb filter as shown in FIG. 1, in which one honeycomb segment 4 of two adjacent honeycomb segments 4 and 5 has a projection 2a at a portion of a side 6 facing a side 7 of the other honeycomb segment 5 and is contacted with a portion of the side 7 of the adjacent other honeycomb segment 5 via the projection 2a; a honeycomb filter as shown in FIG. 2, in which one honeycomb segment 4 of two adjacent honeycomb segments 4 and 5 is provided with a heat-conductive member 18 composed of the same material as that of the honeycomb segment 4 at a portion of a side 6 facing a side 7 of the other honeycomb segment 5 and is contacted with a portion of the side 7 of the adjacent other honeycomb segment 5 via the heat-conductive member 18; and a honeycomb filter as shown in FIG. 3, in which each of two adjacent honeycomb segments 4 and 5 has a projection (not shown) or a heat-conductive member 18 at a portion of the side 6 or 7 (6 and 7 face each other) and the adjacent honeycomb segments 4 and 5 are in contact via respective projections or heat-conductive members.

Of these, preferred is a honeycomb filter in which at least one honeycomb filter 4 of two adjacent honeycomb filters 4 and 5 has a heat-conductive member 18 (19) composed of the same material as that of the honeycomb segment 4 and is contacted with the other adjacent honeycomb segment 5 via the heat-conductive member 18 (19).

As to the positions of the contact portion 8 and the noncontact portion 12, there can be mentioned, for example, cases as shown in FIGS. 4 to 11, wherein a contact portion 8 is provided at the center of a honeycomb filter 10 without being extended to the outer surface 23, exhaust gas inlet face 16 and exhaust gas outlet face 14 of the honeycomb filter and a noncontact portion 12 is provided so as to include an entire part opening to the surface 23 and the faces 14 and 16.

As shown in FIGS. 4 to 11, in such honeycomb filters, since a bonding material 24 can be provided so as to include an entire part opening to the exhaust gas inlet face 16, the exhaust gas outlet face 14 and the outer surface 23 of honeycomb filter 10, a structure becomes possible in which the blowing-through of soot can be prevented effectively. Further, since a contact portion 8 is provided at the center of filter, the temperature of the entire portion of filter can be uniformized easily and a portion 37 possessing no bonding material 24 can be provided outside of the contact portion 8 (toward the exhaust gas inlet face, the exhaust gas outlet face, and the outer surface of honeycomb filter); therefore, a structure becomes possible in which thermal stress can be reduced more effectively. Moreover, since the contact area 8 is provided more toward the center of honeycomb filter 10 than the bonding material 24 is provided, contact can be secured reliably even when deformation appears in the filter owing to the thermal expansion.

In the present invention, there is no particular restriction as to the shape of the contact portion 8. As its sectional shape in the axial direction of honeycomb filter 1, there can be mentioned, for example, a triangle, a rectangle, a square, a rhomb, a trapezoid, an ellipse, a circle, a track circle, a semiellipse and a semicircle. Of these, preferred are an ellipse, a circle, a track circle, etc. because the temperature of the whole portion of filter 10 can be uniformized easily.

In the present invention, the contact portion 8 preferably has an appropriate area in order to increase thermal conductivity and thereby reduce the thermal stresses of honeycomb segments 4 and 5 and also in consideration of, for example, the bonding strength of honeycomb segments 4 and 5 by bonding material 24 (to be described later) and the thermal conductivity by bonding material 24.

Further, in the honeycomb filter 10 of the present invention, each two adjacent honeycomb segments 4 and 5 are bonded with each other at each part of respective noncontact portions 12 via a bonding material 24 having a strength lower than that of the basal body of honeycomb segments 4 and 5. Thereby, in the filter wherein the honeycomb segments 4 and 5 are unified, the restraint by the bonding material 24 is made low and the thermal stresses in various positions of filter can be reduced.

In the present specification, "strength" refers to a value obtained by measurement according to a four-point bending strength test (JIS 1601)

In the present invention, the bonding material 24 may be any bonding material having a strength lower than that of the basal body of honeycomb segments 4 and 5, as mentioned above, and need not be a heat-conductive material in order to secure thermal conductivity in the whole portion of filter 10. However, it is preferred to allow the bonding material 24 to be composed of a heat-conductive component and thereby secure thermal conductivity both at the contact portions 8 and 9 and at the bonding parts 35 and 36, because a large reduction in thermal stress can be obtained.

In view of that the bonding material is exposed to high temperatures during the use of filter, the bonding material is preferably composed mainly of a heat-resistant inorganic compound because the compound is superior in heat resistance and thermal shock resistance. As the heat-resistant inorganic compound, there can be mentioned, for example, those materials obtained by mixing a fiber material (containing a ceramic and/or a metal, used in the above-mentioned powder material) or a powder with a cement, etc.

Of these, preferred is a material obtained by mixing a fiber material (containing a ceramic and/or a metal, used in the powder material) with a cement, etc., because it has a high elastic modulus and can reduce thermal stress greatly. As the cement, there can be mentioned a hydrated cement, a thermosetting cement, etc. with the thermosetting cement being preferred for its strength and workability.

In the present invention, the bonding material 24 may be provided in the entire part of the noncontact portion 12, as shown in FIGS. 8 to 11, or in part of the noncontact portion 12, as shown in FIGS. 4 to 7.

In the former structure, it is possible to increase the strength against mechanical stress, of the whole portion of honeycomb filter 10. Meanwhile, in the latter structure, it is possible to further reduce the thermal stress of the whole portion of honeycomb filter 10.

When the bonding material 24 is provided in part of the noncontact portion 12, a part 37 not provided with the bonding material 24 (this part is hereinafter referred to as "non-bonding part" in some cases) is preferably provided at a location extending from the contact portion 8 toward the exhaust gas inlet face 16 or toward the exhaust gas outlet face 14.

Thereby, the thermal stresses at the exhaust gas inlet face 16 and the exhaust gas outlet face 14 (at these faces, a large thermal stress appears during the use of filter) can be reduced concentratedly and the thermal stress in the whole portion of honeycomb filter 10 can be reduced effectively.

In order to prevent the blowing-through of soot, the bonding material 24 is preferably provided so as to include at least the entire part of the noncontact portion 12, opening to the exhaust gas inlet face 16, more preferably so as to include the entire part of the noncontact portion 12, opening to the exhaust gas inlet face 16, the exhaust gas outlet face 14 and the outer surface 23.

Figure 4:
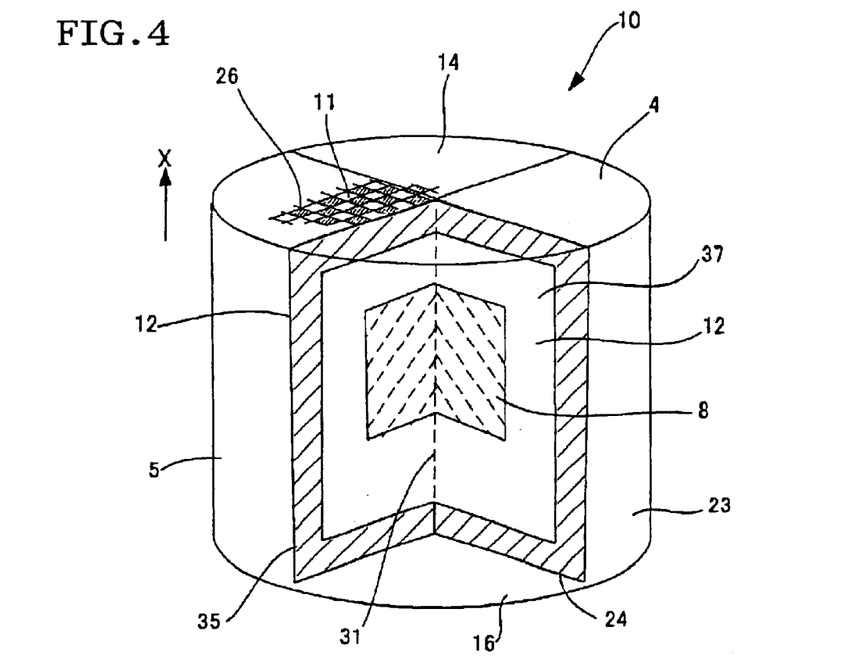
FIG. 4 is a perspective view schematically showing still other embodiment of the honeycomb filter according to the present invention.
Figure 5:
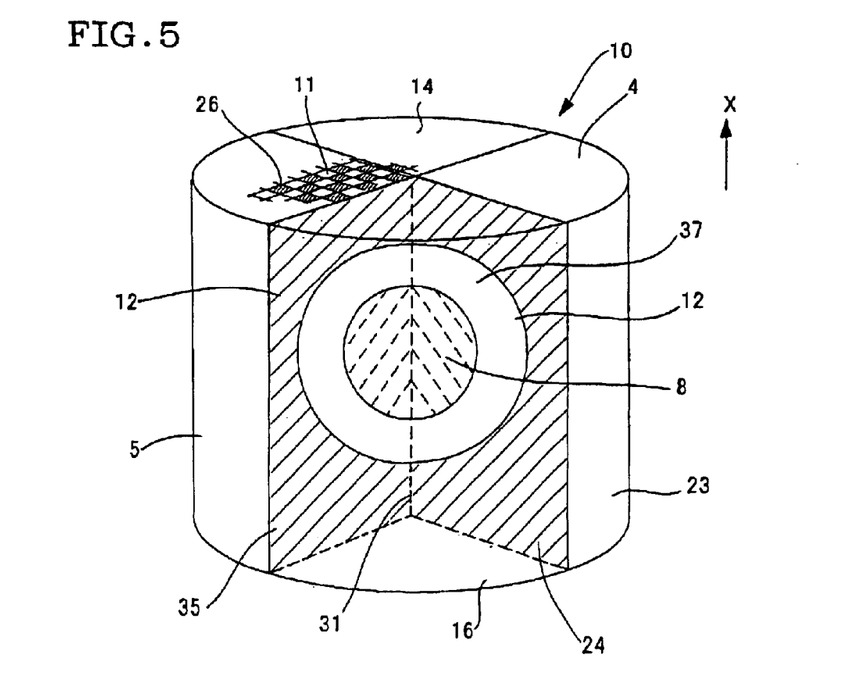
FIG. 5 is a perspective view schematically showing still other embodiment of the honeycomb filter according to the present invention.
Figure 6:
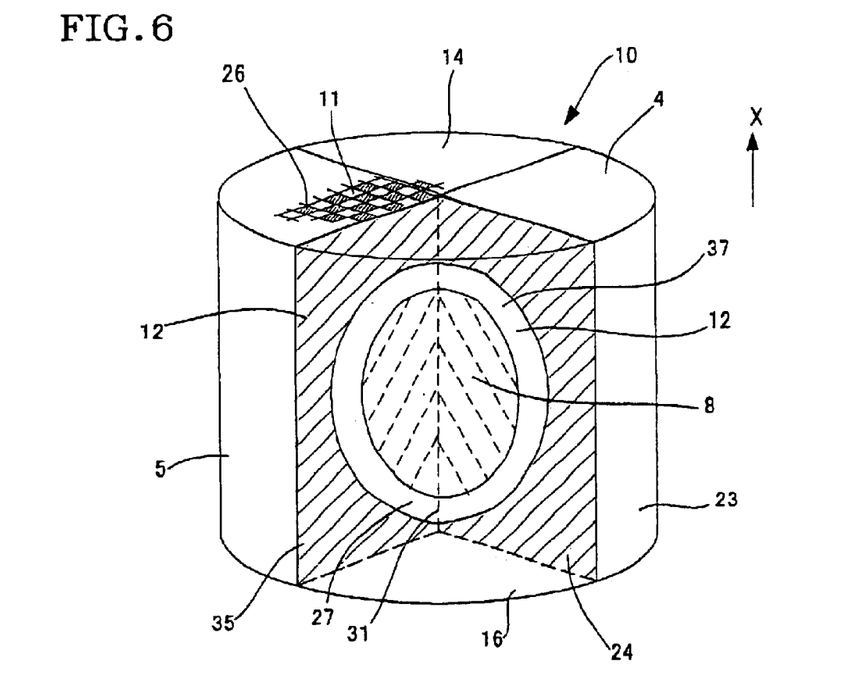
FIG. 6 is a perspective view schematically showing still other embodiment of the honeycomb filter according to the present invention.
Figure 7:
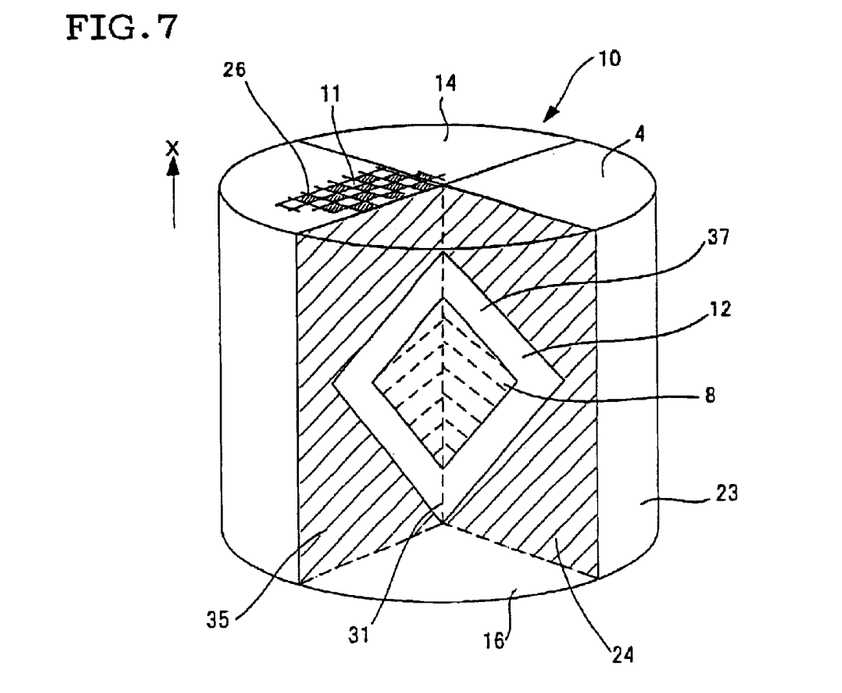
FIG. 7 is a perspective view schematically showing still other embodiment of the honeycomb filter according to the present invention.
Figure 13A:
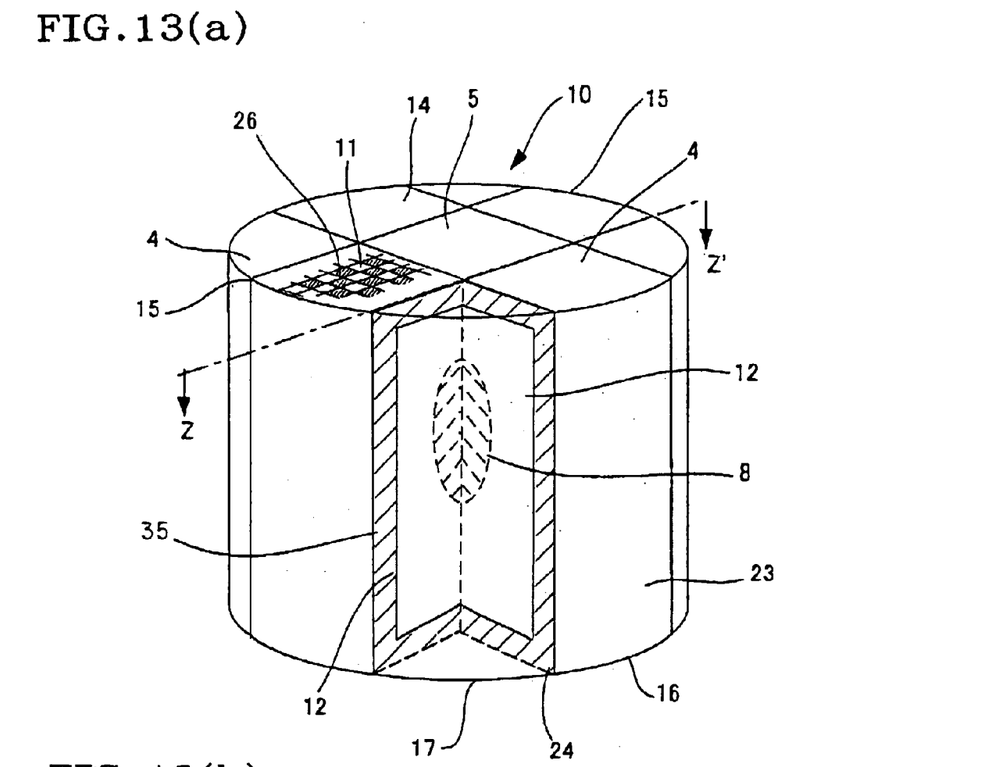
FIG. 13(a) is a perspective view.
Figure 13B:
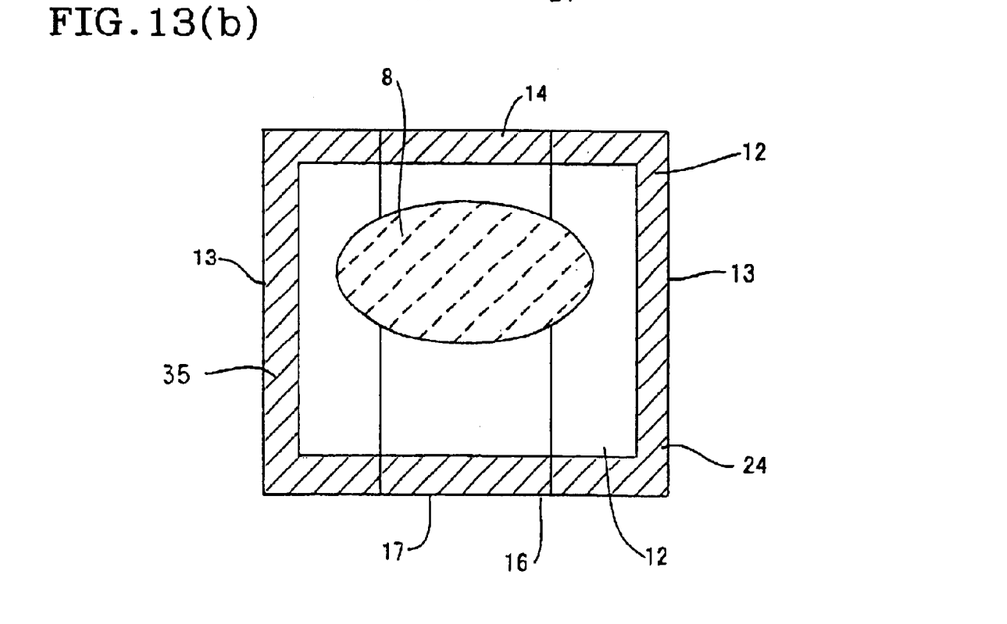
FIG. 13(b) is a sectional view taken at Z–Z' of FIG. 13(a).

In this case, as shown in FIG. 4 and FIGS. 13(a) and (b), the bonding material 24 may be provided in a constant width from the outer surface, the exhaust gas inlet face 16 and the exhaust gas outlet face 14 towards directions perpendicular to 23, 16 and 14; or, as shown in FIGS. 5 to 7, the bonding material 24 may be provided in different widths.

In the present invention, as shown in FIGS. 4 to 7, the non-bonding part 37 may have a shape such as tetragon (e.g. rectangle, square or rhomb), trapezoid, circle, track circle or the like in correspondence to the shape of the contact portion 8; or, as shown in FIGS. 13(a) and (b), the nonbonding part 37 may have a shape different from that of the contact portion 8.

2. Process for Production of Honeycomb Filter

In the process for producing a honeycomb filter according to the present invention, first, a powder material composed of a ceramic and/or a metal, a binder and water are kneaded and molded to obtain a honeycomb structure having a plurality of through-holes separated from each other by partition walls; this honeycomb structure is dried; then, the plurality of through-holes are plugged alternately at the exhaust gas inlet face and the exhaust gas outlet face to obtain a dried honeycomb segment.

As the powder material composed of a ceramic and/or a metal, there can be mentioned, for example, those each containing, as its main component, at least one kind selected from the group consisting of metallic silicon, silicon carbide, titanium, zirconium, boron carbide, titanium carbide, zirconium carbide, silicon nitride, boron nitride, aluminum nitride, aluminum oxide, zirconium oxide, mullite, materials capable of forming cordierite, aluminum titanate, sialon, kaolin, talc, aluminum hydroxide, fused silica and quartz. Of these, preferred are those composed mainly of metallic silicon and silicon carbide, or of silicon carbide, for the thermal conductivity and heat resistance.

As the binder, there can be mentioned, for example, hydroxymethyl cellulose, methyl cellulose, hydroxyethyl cellulose, carboxymethyl cellulose and a polyvinyl alcohol. These binders can be used singly or in combination of two or more kinds.

In the present invention, it is possible to as necessary add, besides, ethylene glycol, dextrin, a fatty acid soap, a polyalcohol or the like, all used generally as a molding aid.

The amount of water added is ordinarily about 10 to 40 parts by weight relative to 100 parts by weight of the above-mentioned powder material. After addition of water, the resulting mixture is kneaded using a vacuum pug mill or the like to obtain a plastic material.

The method for molding is preferably extrusion, and the extrusion can be conducted using, for example, a ram extruder or a twin screw continuous extruder.

As the method for drying the honeycomb structure, there can be mentioned, for example, hot air drying, microwave drying, dielectric drying, reduced pressure drying, vacuum drying and freeze-drying. Of these, dielectric drying, microwave drying and hot air drying can preferably be used singly or in combination.

The plugging material may be one used ordinarily. For example, the same material as the above-mentioned powder material can be used.

In the process for producing a honeycomb filter according to the present invention, then, there is formed, at a portion of one side of the dried honeycomb segment obtained above, a contact portion to be contacted with a side of other dried honeycomb segment, followed by drying and firing, to obtain a honeycomb segment.

Figure 14:
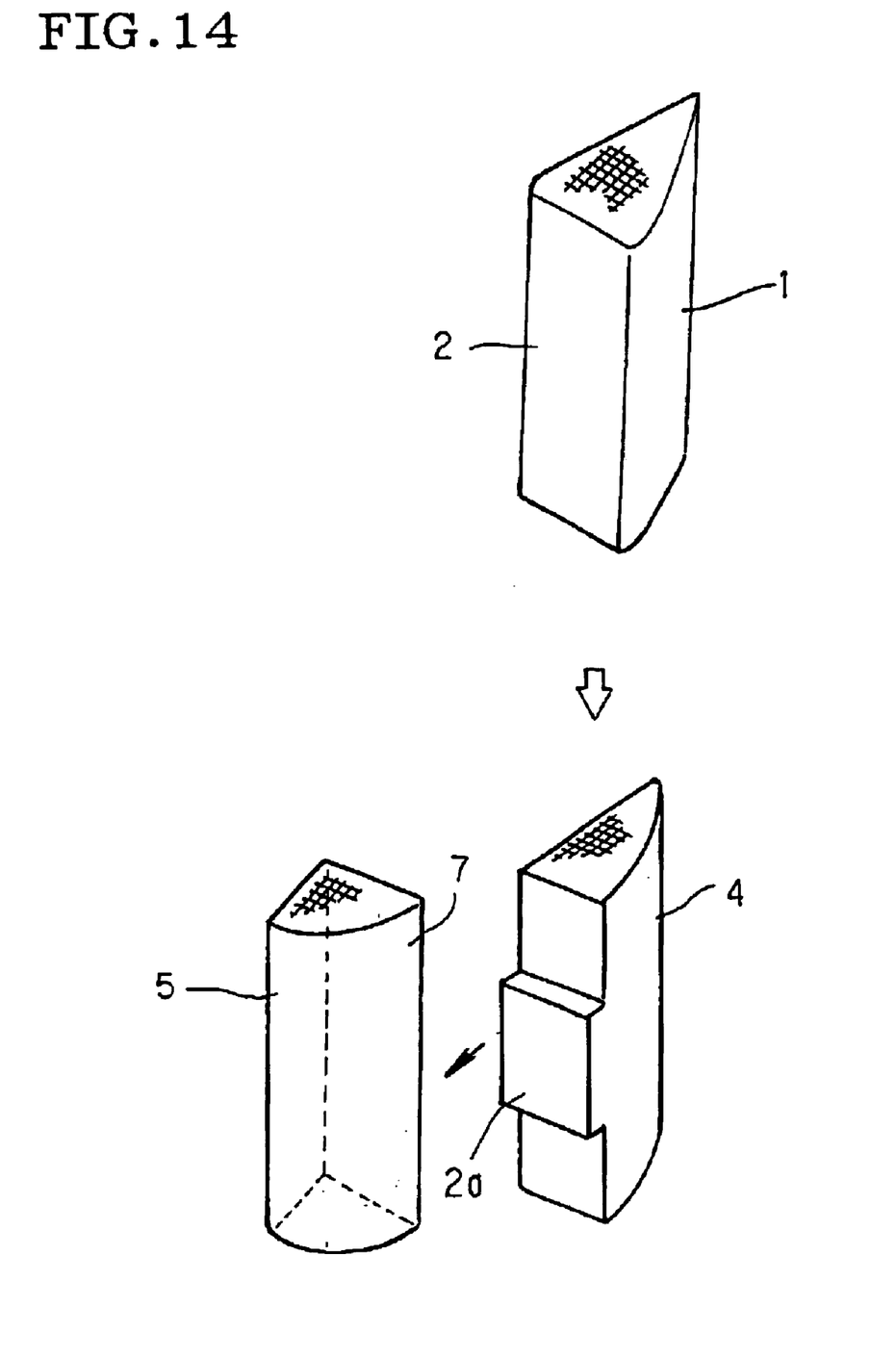
FIG. 14 schematically shows an example of the method for forming a contact portion in the process of the present invention.
Figure 15:
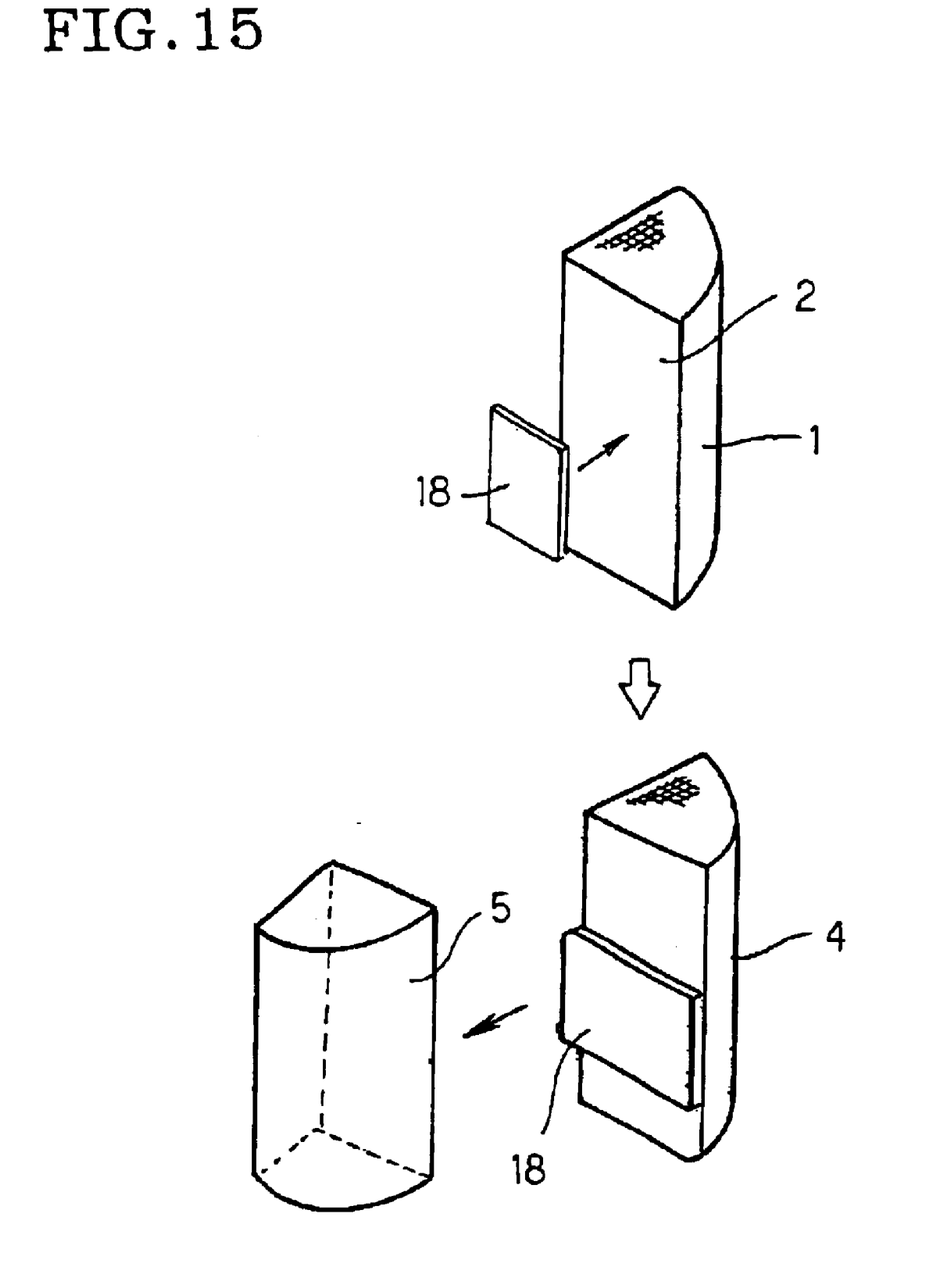
FIG. 15 schematically shows other example of the method for forming a contact portion in the process of the present invention.

As the method for forming the contact portion, there can be mentioned, for example, a method wherein, as shown in FIG. 14, a dried honeycomb segment 1 is subjected to cutting or other processing to form a projection at a portion of a side 2; and a method wherein, as shown in FIG. 15, there is bonded, to a portion of a side 2 of a dried honeycomb segment 1, a heat-conductive member 18 composed of the same material as the dried honeycomb segment 1. Of these, the latter method is preferred because it allows easy designing of the contact portion.

Figure 16:
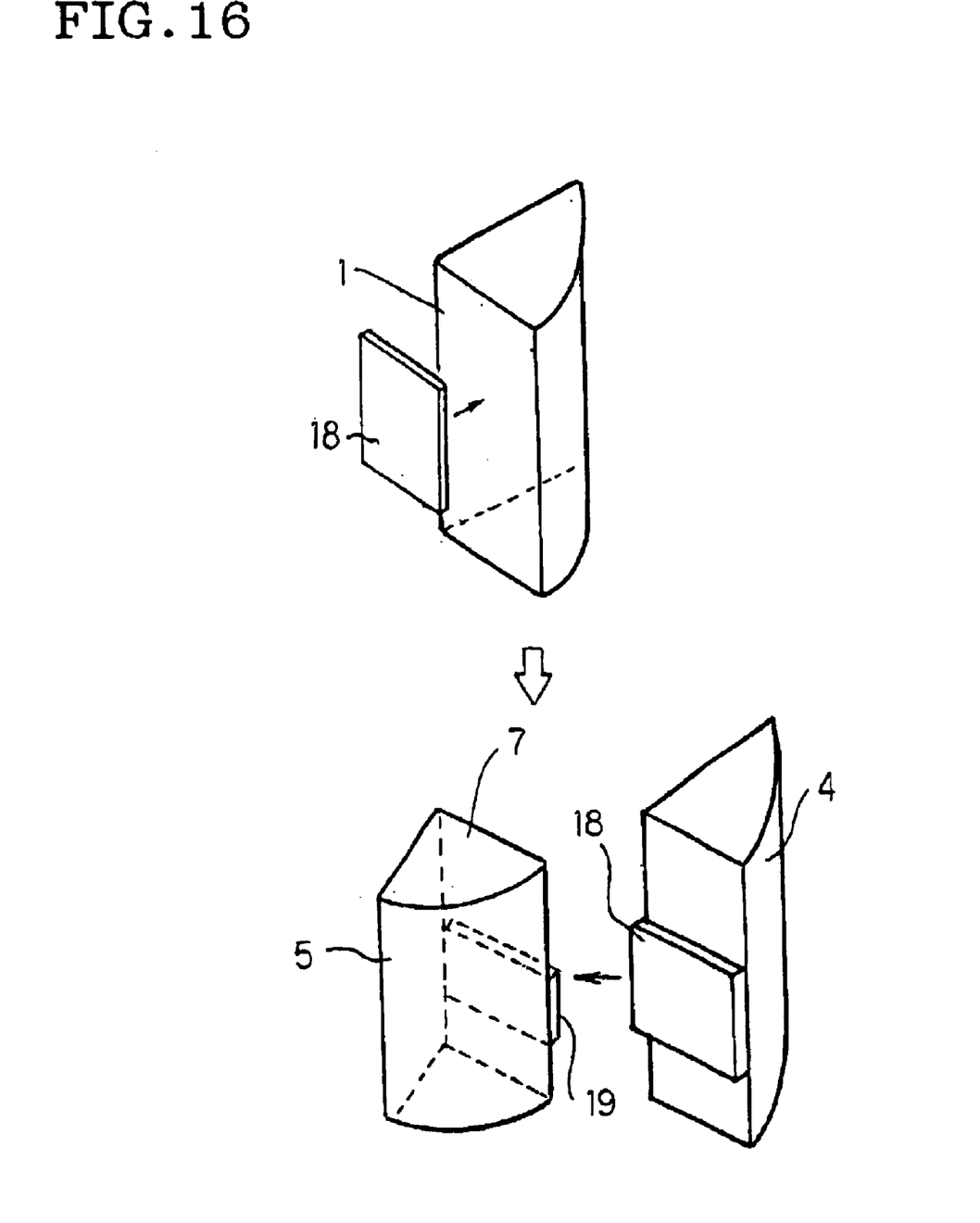
FIG. 16 schematically shows still other example of the method for forming a contact portion in the process of the present invention.

As shown in FIG. 16, projections (not shown) or heat-conductive members 18 and 19 may be formed in two dried honeycomb segments 1 to be contacted with each other.

The method for drying is the same as the above-mentioned method for drying a honeycomb structure. As to the firing conditions, appropriate conditions may be selected depending upon the kind of the material used.

In the production process according to the present invention, then, the formed contact portion (which is a heat-conductive member or a projection) of honeycomb segment is contacted with a portion of a side of other adjacent honeycomb segment; further, there is provided, at least at part of the noncontact portion, a bonding material having a strength lower than that of the basal body of honeycomb segment; thereby, a unified body is obtained.

The position of the contact portion, etc, and the components constituting the bonding material, etc. are the same as described for the honeycomb filter of the present invention; therefore, description thereof is not made here.

However, as the heat-resistant inorganic compound used as a component of the bonding material, a mixture obtained by adding as necessary an organic or inorganic binder, etc. is used preferably. The bonding material may be provided in the form of, for example, a plate-shaped dried material or slurry.

The bonding by the bonding material can be made, for example, by providing a bonding material at part of the noncontact portion and conducting hydration or a heat treatment depending upon the component of the bonding material.

When the bonding is made by a heat treatment, an appropriate heat treatment temperature may be selected depending upon the component of the bonding material. The heat treatment is generally conducted preferably at 200 to 400° C.

When a plate-shaped dried bonding material is used, the bonding may be made, for example, by moistening the bonding material and press-bonding it, and then conducting hydration or a heat treatment. When a slurry-like bonding material is used, the slurry-like material is coated and then hydration or a heat treatment is conducted.

The present invention is specifically described in more detail below by way of Examples. However, the present invention is in no way restricted by these Examples.

EXAMPLE 1

A mixed powder consisting of 75% by weight of a SiC powder and 25% by weight of a metallic Si powder was used as a ceramic material. To 100 parts by weight of this mixed powder were added 6 parts by weight of a binder composed of methyl cellulose and hydroxypropoxyl-methyl cellulose, 0.8 part by weight of a surfactant and 22 parts by weight of water. The resulting mixture was kneaded using a kneader to obtain a plastic puddle.

Then, the puddle was subjected to extrusion molding to obtain honeycomb structures each having such an appearance and shape as obtained by cutting a column into four portions with a plane including the central axis, a fan-shaped section in a direction perpendicular to the axial direction, a partition wall thickness of 0.3 mm and a cell density of 31 cells/cm$^2$.

Then, each honeycomb structure was dried using a microwave and hot air and then the through-holes thereof were plugged alternately both at the exhaust gas inlet face and at the exhaust gas outlet face to obtain a dried honeycomb segment.

Then, the dried honeycomb segment was coated, at a portion of its side, with a slurry composed of the same material as that of dried honeycomb segment, after which a plate-shaped heat-conductive member composed of the same material as that of dried honeycomb segment was press-bonded to the slurry-coated portion, followed by drying to obtain a dried honeycomb segment to which the heat-conductive member was bonded.

Then, the resulting dried composite segment was subjected to debinding in a N$_2$ atmosphere at about 400° C. and then fired in an inert atmosphere such as Ar or the like at about 1,550° C. to obtain a composite honeycomb segment.

Then, the contact portion (constituted by the heat-conductive member) of the composite honeycomb segment was contacted with a portion of a side (facing the composite honeycomb segment) of an adjacent other honeycomb segment. Then, at each part of respective noncontact portions was provided a bonding material composed of an aluminosilicate-based fiber, a SiC powder, an inorganic binder and water; the respective honeycomb segments were bonded into a unified body to obtain a honeycomb filter having a structure shown in FIG. 4. The unified honeycomb filter had a dimension of 144 mm (diameter)×152 mm (length) and the noncontact portion thereof had a gap of 2 mm.

EXAMPLE 2

A dried honeycomb segment was produced in the same manner as in Example 1. The dried honeycomb segment was subjected to cutting to form a projection at its side, followed by firing to form a honeycomb segment.

Then, such honeycomb segments were combined so that the projection of honeycomb segment came to contact directly with a side of other honeycomb segment adjacent to the former honeycomb segment; the same bonding material as in Example 1 was provided at part of each noncontact portion of the sides facing each other (the adjacent honeycomb segments were not in contact with each other at the noncontact portions); the adjacent honeycomb segments were bonded with each other into one piece; thereby, a honeycomb filter shown in FIG. 4 was obtained.

The honeycomb segment had a dimension of 144 mm (diameter)×152 mm (length), a partition wall thickness of 0.3 mm and a cell density of 31 cells/cm$^2$.

EXAMPLES 3 to 5

Figure 8:
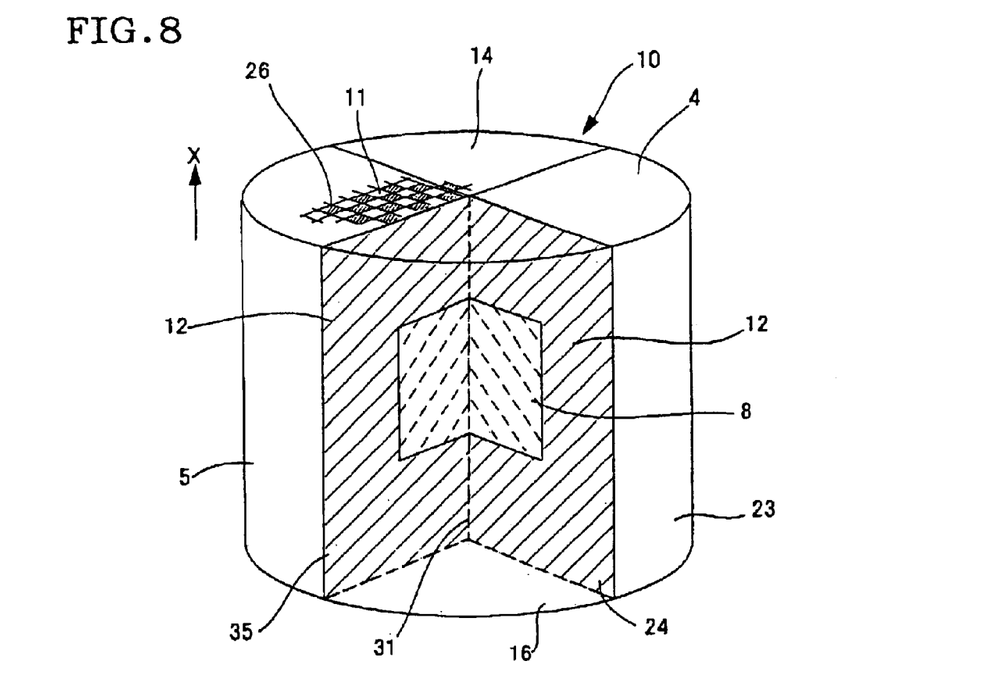
FIG. 8 is a perspective view schematically showing still other embodiment of the honeycomb filter according to the present invention.
Figure 9:
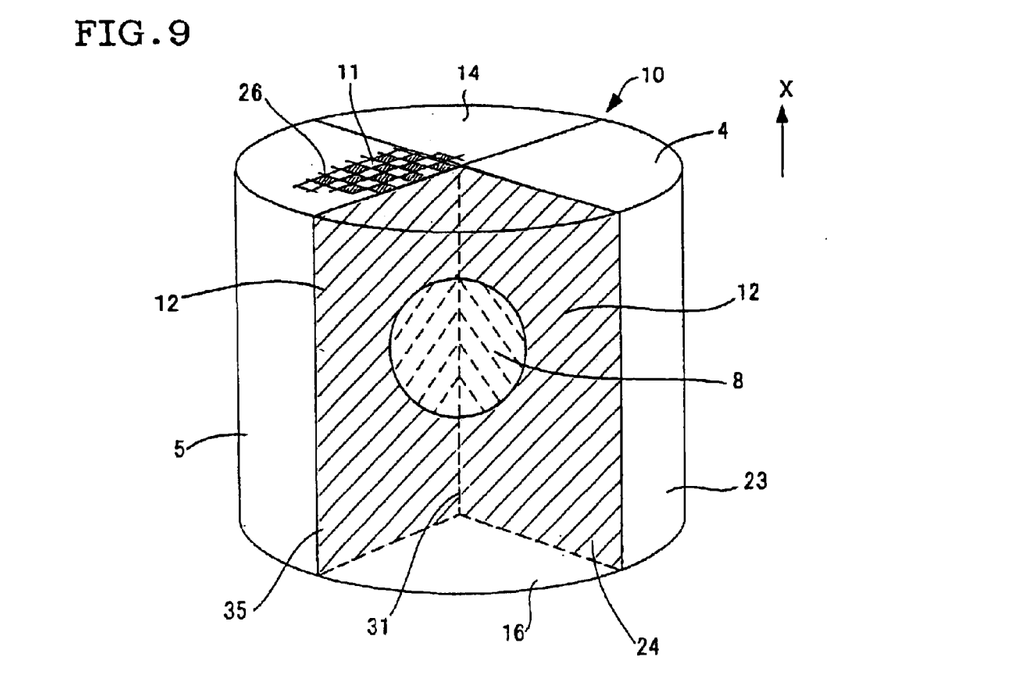
FIG. 9 is a perspective view schematically showing still other embodiment of the honeycomb filter according to the present invention.
Figure 10:
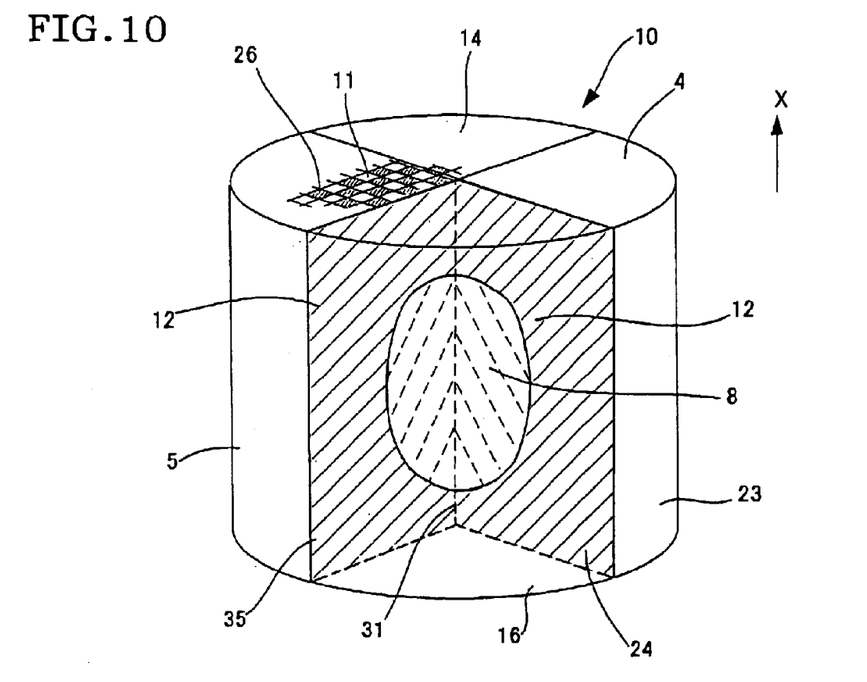
FIG. 10 is a perspective view schematically showing still other embodiment of the honeycomb filter according to the present invention.
Figure 11:
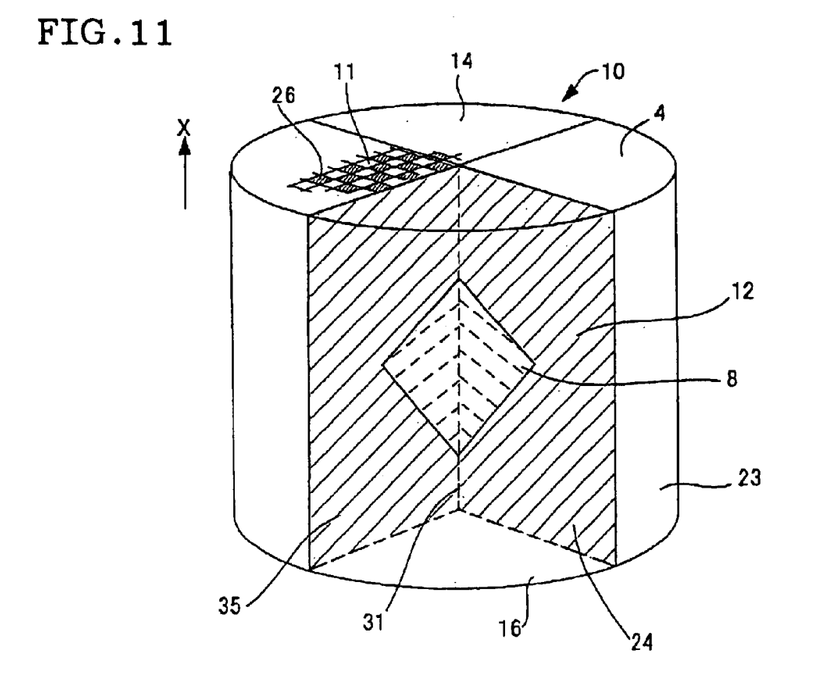
FIG. 11 is a perspective view schematically showing still other embodiment of the honeycomb filter according to the present invention.

Honeycomb filters were obtained in the same manner as in Example 1 except that there were employed structures shown in FIG. 8, FIGS. 12(a) and (b) and FIGS. 13(a) and (b), respectively.

COMPARATIVE EXAMPLE 1

A honeycomb filter was obtained in the same manner as in Example 1 except that each two adjacent honeycomb segments were provided with a bonding material composed of an aluminosilicate-based fiber, a SiC powder, an inorganic binder and water, at each whole portion of respective sides facing each other, to form a contact portion-free structure.

COMPARATIVE EXAMPLE 2

A honeycomb filter was obtained in the same manner as in Example 1 except that each two adjacent honeycomb segments were coated with a slurry composed of the same material as that of dried honeycomb segment, at each whole portion of respective sides, then, a plate-shaped heat-conductive member composed of the same material as that of dried honeycomb segment was press-bonded to each slurry-coated portion, drying was followed to bond the heat-conductive members to the two dried honeycomb segments, thereby a contact portion-free structure was obtained.

Evaluation Method

A ceramic-made nonintumescent mat as a holding material was wound round the outer surface of each of the silicon carbide-based honeycomb filters obtained in Examples 1 to 5 and Comparative Examples 1 and 2. Each resulting honeycomb filter was forced into a SUS 409-made canning case to obtain canning structures. Then, a soot-containing combustion gas generated by combustion of a gas oil (a diesel fuel) was allowed to flow into the canning structure from the lower face (exhaust gas inlet face) and leave from the upper face (exhaust gas outlet face) of honeycomb structure, in each of the above-mentioned drawings, whereby the soot was captured inside the honeycomb structure.

Then, each canning structure was allowed to cool to room temperature and then a combustion gas containing a given proportion of oxygen was allowed to enter at 900° C. from the upper face (exhaust gas outlet face) of honeycomb structure, to burn and remove the soot. Thus, a filter regeneration test was carried out.

In this filter regeneration test, the transition period of increasing the inlet gas temperature to 900° C. and the weight of soot captured were each set at three levels and regeneration of filter was carried out, after which generation of cracks was examined at the upper face (exhaust gas outlet face), lower face (exhaust gas inlet face), side and inside of honeycomb structure. The results of evaluation are summarized in Table 1. Incidentally, in Table 1, Δ indicates generation of cracks and O indicates no generation of cracks.

TABLE 1

| Amount of soot captured<br>Transition period | Largest<br>Shortest | | | | Large<br>Short | | | | Standard<br>Standard | | | |
|---|---|---|---|---|---|---|---|---|---|---|---|---|
| Sites of cracks examined | Inlet*1 | Outlet*2 | Inside | Side*3 | Inlet*1 | Outlet*2 | Inside | Side*3 | Inlet*1 | Outlet*2 | Inside | Side*3 |
| Example 1 (FIG. 4) | Δ | Δ | Δ | Δ | Δ | O | O | Δ | O | O | O | O |
| Example 2 (FIG. 4) | Δ | Δ | Δ | Δ | Δ | O | O | Δ | O | O | O | O |
| Example 3 (FIG. 8) | Δ | Δ | Δ | Δ | Δ | Δ | O | Δ | O | O | O | O |
| Example 4 (FIG. 12) | O | Δ | O | Δ | O | O | O | Δ | O | O | O | O |
| Example 5 (FIG. 13) | O | O | O | Δ | O | O | O | O | O | O | O | O |
| Comparative Example 1 (FIG. 4) | Δ | Δ | Δ | Δ | Δ | Δ | Δ | Δ | O | Δ | O | O |
| Comparative Example 2 (FIG. 4) | Δ | Δ | Δ | Δ | Δ | Δ | Δ | Δ | Δ | Δ | Δ | Δ |

Inlet*1: Exhaust gas inlet face
Outlet*2: Exhaust gas outlet face
Side*3: Outer surface Evaluation As is clear from Table 1, even under the standard conditions, generation of cracks was seen in the exhaust gas outlet face of honeycomb filter, in the honeycomb filter of Comparative Example 1 where each two adjacent honeycomb segments were bonded with a bonding material at each whole portion of their sides facing each other; and generation of cracks was also seen in all of the exhaust gas inlet face, exhaust gas outlet face, side and inside of honeycomb filter, in the honeycomb filter of Comparative Example 2 where the sides of each two adjacent honeycomb segments facing each other were bonded with each other at their whole portions using a heat-conductive member composed of the same material as that of dried honeycomb segment.

In contrast, no crack was seen in the honeycomb filters of Examples 1 to 5 where each two adjacent honeycomb segments were contacted with each other at each portion of their sides facing each other and were bonded with each other at least at part of each portion of their sides other than the contact portion via a bonding material having a strength lower than that of the basal body of honeycomb segment.

When the transition period was shortened, the weight of soot captured was increased and the non-uniformity of temperature was made extremely large, generation of cracks was seen partially even in the Examples of the present invention. However, generation of cracks was few in Example 1 and 5 where a bonding material was provided at part of the noncontact portion as shown in FIG. 4 and FIGS. 13(a) and (b), as compared with the results in Examples 3 and 4 where the bonding material was provided at the whole part of the noncontact portion as shown in FIG. 8 and FIGS. 12(a) and (b).

Generation of cracks was very few in the honeycomb filters of Examples 4 and 5 where the honeycomb filter was divided into 9 portions, the contact portion was provided in a large number, and the volume of each honeycomb segment was made small as shown in FIGS. 12(a) and (b) and FIGS. 13(a) and (b), as compared with the results in Examples 1 and 5 where the honeycomb filter was divided into 4 portions with a plane including the central axis.

Industrial Application

As described above, the present invention can provide a honeycomb filter wherein generation of cracks, etc. owing to thermal stress can be reduced extremely as compared with the case using conventional honeycomb filters and this feature is striking particularly when the filter is composed mainly of silicon carbide or of metallic silicon and silicon carbide; and a process for producing such a honeycomb filter.

What is claimed is:

1. A honeycomb filter obtained by bonding a plurality of honeycomb segments each having a plurality of through-holes which are separated from each other by porous partition walls and which are plugged alternately at the exhaust gas inlet face and exhaust gas outlet face of honeycomb segment, characterized in that each two adjacent honeycomb segments are allowed to contact with each other at each portion of their sides facing each other and are bonded with each other at least at part of each portion of said sides other than the contacted portion via a bonding material having a strength lower than that of a basal body of honeycomb segment.

2. A honeycomb filter according to claim 1, wherein the each portion of said sides other than the contacted portion is provided so as to include at least a whole part of said sides opening to the gas inlet face of honeycomb segment.

3. A honeycomb filter according to claim 2, wherein the each portion of said sides other than the contacted portion includes at least the whole part of said sides leading to the exhaust gas inlet face of honeycomb segment and the bonding material is provided at part of the each portion of said sides other than the contacted portion.

4. A honeycomb filter according to claim 1, wherein the each portion of said sides other than the contacted portion is provided so as to include at least a whole part of said sides opening to the exhaust gas inlet face of honeycomb segment, the exhaust gas outlet face of honeycomb segment and an outer surface of honeycomb filter.

5. A honeycomb filter according to claim 1, wherein at least one of the each two adjacent honeycomb segments has a projection at a portion of its side facing one side of the other honeycomb segment and contacts, via said projection, with a portion of said side of the other adjacent honeycomb segment.

6. A honeycomb filter according to claim 1, wherein at least one of the each two adjacent honeycomb segments has a heat-conductive member composed of the same material as that of honeycomb segment at a portion of its side facing one side of the other honeycomb segment and contacts, via said heat-conductive member, with a portion of said side of the other adjacent honeycomb segment.

7. A honeycomb filter according to claim 1, wherein the honeycomb segments are composed mainly of silicon carbide or of metallic silicon and silicon carbide.

8. A honeycomb filter according to claim 1, wherein the bonding material is composed mainly of a heat-resistant inorganic compound.

9. A honeycomb filter according to claim 1, characterized in that the partition walls have a metal having a catalytic activity, loaded thereon.

10. A process for producing a honeycomb filter, characterized by kneading a powder material composed of a ceramic and/or a metal, a binder and water to obtain a puddle and molding the puddle to obtain a honeycomb structure having a plurality of through-holes separated by partition walls from each other, drying the honeycomb structure and then plugging the plurality of through-holes alternately at the exhaust gas inlet face and exhaust gas outlet face of honeycomb structure to obtain a dried honeycomb segment, bonding, to a portion of each side of the dried honeycomb segment, a heat-conductive member composed of the same material as that of the dried honeycomb segment, followed by drying and firing to obtain a composite honeycomb segment, contacting the heat-conductive member-provided honeycomb segment, via the heat-conductive member, with a portion of a side of other adjacent honeycomb segment facing the former honeycomb segment, and providing, at least at part of each portion of the two sides facing each other, other than the contact portion, a bonding material having a strength lower than that of a basal body of honeycomb segment, to obtain a unified body.

11. A process for producing a honeycomb filter according to claim 10, wherein the powder material is composed mainly of silicon carbide.

12. A process for producing a honeycomb filter according to claim 10, wherein the powder material is composed mainly of metallic silicon and silicon carbide.

13. A process for producing a honeycomb filter according to claim 10, wherein the bonding material is composed mainly of a heat-resistant inorganic compound.

14. A process for producing a honeycomb filter, characterized by kneading a powder material composed of a ceramic and/or a metal, a binder and water to obtain a puddle and molding the puddle to obtain a honeycomb structure having a plurality of through-holes separated by partition walls from each other, drying the honeycomb structure and then plugging the plurality of through-holes alternately at the exhaust gas inlet face and exhaust gas outlet face of honeycomb structure to obtain a dried honeycomb segment, subjecting the dried honeycomb segment to a cutting operation to form a projection at each side of the dried honeycomb segment, and conducting firing to obtain a honeycomb segment, contacting each projection formed at each side of the honeycomb segment, with a portion of a side of other adjacent honeycomb segment facing the former honeycomb segment, and providing, at least at part of each portion of the two sides facing each other, other than the contacted portion, a bonding material having a strength lower than that of the dried honeycomb segment, to obtain a unified body.

15. A process for producing a honeycomb filter according to claim 14, wherein the powder material is composed mainly of silicon carbide.

16. A process for producing a honeycomb filter according to claim 14, wherein the powder material is composed mainly of metallic silicon and silicon carbide.

17. A process for producing a honeycomb filter according to claim 14, wherein the bonding material is composed mainly of a heat-resistant inorganic compound.

* * * * *